US011669542B2

(12) United States Patent
Sharkov

(10) Patent No.: US 11,669,542 B2
(45) Date of Patent: Jun. 6, 2023

(54) METHOD FOR DISPLAYING PERSONAL DATABASE CONTENTS ON COMPUTER SCREEN

(71) Applicant: Ilya Alexandrovich Sharkov, St. Petersburg (RU)

(72) Inventor: Ilya Alexandrovich Sharkov, St. Petersburg (RU)

(*) Notice: Subject to any disclaimer, the term of this patent is extended or adjusted under 35 U.S.C. 154(b) by 0 days.

(21) Appl. No.: 17/268,366

(22) PCT Filed: Aug. 1, 2019

(86) PCT No.: PCT/RU2019/000543
§ 371 (c)(1),
(2) Date: Feb. 12, 2021

(87) PCT Pub. No.: WO2020/036510
PCT Pub. Date: Feb. 20, 2020

(65) Prior Publication Data
US 2021/0319041 A1   Oct. 14, 2021

(30) Foreign Application Priority Data

Aug. 14, 2018   (RU) .......................... RU2018129694

(51) Int. Cl.
*G06F 16/26*        (2019.01)
*G06F 16/9538*      (2019.01)
(Continued)

(52) U.S. Cl.
CPC ............ *G06F 16/26* (2019.01); *G06F 3/0482* (2013.01); *G06F 3/04817* (2013.01); *G06F 16/9024* (2019.01); *G06F 16/9538* (2019.01)

(58) Field of Classification Search
CPC ..................................................... G06F 16/26
See application file for complete search history.

(56) References Cited

U.S. PATENT DOCUMENTS 7,305,409 B2    12/2007  Lord et al.
2013/0151517 A1*  6/2013  Cheong ................. G06F 16/951
                                                         707/769
(Continued)

FOREIGN PATENT DOCUMENTS

CN    102880687 A     1/2013
EP      2192503 A1 *  6/2010  ....... G06F 17/30867

OTHER PUBLICATIONS

Frank Van Ham et al., "Search, Show Context, Expand on Demand": Supporting Large Graph Exploration with Degree-of-interest, IEEE Transactions on Visualization and Computer Graphics, vol. 15, No. 6, Nov./Dec. 2009, pp. 953-960.

*Primary Examiner* — Roland J Casillas
(74) *Attorney, Agent, or Firm* — Birch, Stewart, Kolasch & Birch, LLP

(57) ABSTRACT

The invention relates to computing technologies, in particular to a method for displaying personal database contents on a computer screen. The technical effect lies in ensuring personal interactivity of the graphical display of the personal database contents on the computer screen. According to the method, the personal database contains a plurality of data files, each data file is assigned at least one associative identifier that the user associates with said data file, the method includes, obtaining a primary graph comprising a graphical representation of the assigned associative identifiers in the form of a network, each network node comprises an icon of a unique associative identifier from among the assigned associative identifiers. The network nodes are connected in pairs so that between each pair of icons depicting the associative identifiers assigned to the same data file, a link is formed.

9 Claims, 7 Drawing Sheets

(51) Int. Cl.
*G06F 16/901* (2019.01)
*G06F 3/04817* (2022.01)
*G06F 3/0482* (2013.01)

(56) References Cited

U.S. PATENT DOCUMENTS

2017/0213127 A1* 7/2017 Duncan .................. G16B 50/30
2019/0018904 A1* 1/2019 Russell .................. G06F 21/56

* cited by examiner

METHOD FOR DISPLAYING PERSONAL DATABASE CONTENTS ON COMPUTER SCREEN

TECHNICAL FIELD

The invention relates to a field of computing technologies, in particular to a method for displaying personal database contents on a screen of an electronic computer (computer), and may be used, for example, in local devices such as personal computers (PC), laptops, tablets or mobile devices.

BACKGROUND

Ever since the advent of the first file systems and file managers, users have faced an acute problem of the convenience of systematization, that is, classification and grouping, of files on storage media and subsequent navigation in the contents of the latter in order to find the necessary electronic documents. In recent time, with an increase in the volume of used storage media, along with an increase in the availability of electronic devices and Internet access in general, users have become increasingly faced with this problem.

The well-known combination of the file system and the file manager solves the problem in question by the fact that the path to a file saved in the system is a set of tags, each tag is represented in the file system as a directory. There are links between directories that form a tree—a hierarchical file structure.

The disadvantage of the above approach is that the user working with the file system is obliged to indicate a list of tags (path to the file) in a strictly determined order that defines links between tags. Subsequently, to search for a document, it is necessary to restore not only the tags themselves, but also their order. Obviously, the user may forget both the tags themselves and their order, which may lead to a significant increase in the time it takes to find the data files being searched for. To help in such a situation, a graphical visualization (graph) of tags in the form of a directory tree comes, which simplifies this process, allowing one to restore the sequence of tags starting from the first, by sequentially selecting the most appropriate tag from the list of children. However, the directory tree does not completely solve the above problem due to the need to observe the strict order of specifying tags when writing a file and searching for it. To simplify remembering such a sequence, the user is forced to resort to the classification of files according to a certain criterion. In this case, the list of tags, that is, the path to the file, reflects the position of the file in the classification system, this however creates an additional significant disadvantage—the path to the file is frequently not related to the contents of the file itself.

Moreover, it is well known that in the process of searching for information, a human brain naturally builds an associative chain that allows one to find an object that contains information being searched for. So, G. E. Yakhyeva in the work "Basic principles of the theory of neural networks", 2nd edition M.: National Open University "INTUIT", 2016 reveals the possibility of using associative thinking to restore forgotten images. Taking this into account, in the opinion of the inventor, it would be convenient for a computer user when working with a database to navigate and search in the database for the required data files not by their exact name or location (sequence of tags), but by the associations that the user has with data files being searched for. Moreover, since such associations arise during the work of cognitive functions of the user, such as memory, thinking, understanding, etc., the associations that arise may not form a chain "from the general to the particular," that is, the associations may be just a set of arbitrary associations that are not grouped among themselves, individual for each person and, moreover, may modify due to the constant receipt of new knowledge by a person or changes in the results of the work of the cognitive functions of a person brain. Accordingly, it is expedient to provide the user with the ability to create a personal database in which all data files are associated with the associations of the user, and for searching and navigating in the database, the user is provided with an interface that provides an updatable display of the database contents based on user-assigned associations and their relationships.

The prototype of the invention is a graph known from the patent application US 2013/0151517 A1, IPC G06F 17/30, published on Jun. 13, 2013, the graph displaying the contents of a database including a plurality of files, each of which the user has assigned one or more tags that the user associates with the file, and the graph is configured in the form of a network, each node of which contains an icon of a unique tag from among the assigned tags, moreover, the network nodes are connected in pairs by links formed between each pair of tags assigned to the same file. According to the known patent application, to search for files, the user first defines a search query using keywords and, in case of an unsatisfactory search result, may further use the graph to select other possible associative tags assigned to the previously searched files and use them to find the files being originally searched for.

The disadvantage of the graph according to the prototype is that such a graph does not display the contents of the database so that the user understands what information prevails in the database and, accordingly, how it should be searched for, wherein, from US 2013/0151517 A1, it remains generally unclear how links are formed between tags, which, according to the description, are formed "automatically." In particular, the description of the prototype does not disclose either the principle or the algorithm for forming such links, which does not allow one to understand how exactly the tag network is built, and what is the degree of personalization of such a network for the user. Since the description of the prototype does not disclose the principle of building links between tags, the above graph does not provide the ability to modify or adapt in case of changes in the database contents or the relationship between the contents. Finally, US 2013/0151517 A1 does not disclose how a user may navigate the graph and, accordingly, how, via graph navigation, the user may interact with the contents of the personal database.

SUMMARY

The technical problem solved by the invention consists in obtaining a method for displaying the contents of a personal database on a computer screen, which provides a personal, informative and natural display of the contents of the personal database for the user, and which allows a quick and intuitive interaction of the user with the contents of the personal database.

The technical effect lies in ensuring personal interactivity of the graphical display of the contents of a personal database on a computer screen, as well as in eliminating at least one of the disadvantages of prior art solutions. Thanks to the claimed invention, when interacting with a database, instead of memory or thinking, for example, the user may use the visual-associative functions of the brain, which for many users, as individuals, seems more natural and simple than the use of memory, logic and other cognitive functions of the brain. The use of the claimed method allows to optimize the process of displaying the contents of a personal database, taking into account the individual characteristics of the users perception of information, which also allows to store, accumulate and analyze personal information in the most efficient way.

The essence of the claimed method is as follows.

A method for displaying personal database contents on a computer screen, the personal database containing a plurality of data files, each data file is assigned at least one associative identifier (AI) that the user associates with said data file, the method comprising obtaining a primary graph comprising a graphical representation of the assigned associative identifiers in the form of a network, each network node comprises an icon of a unique associative identifier from among the assigned associative identifiers, wherein the network nodes are connected in pairs so that between each pair of icons depicting the associative identifiers assigned to the same data file, a link is formed. Unlike the prototype, the above method comprises calculating for each associative identifier of a subjective significance weighting factor (m) which determines the size of the associative identifier icon, calculating for each link of a weighting factor (n) which determines a display parameter of the link, and obtaining a modified graph in response to each calculation of at least one of the weighting factors (m, n).

In accordance with the method, the users personal database contains a plurality of data files of any file format written to a data storage device built into the computer or to a peripheral or external cloud storage to which the computer has a connection.

The above computer may be, for example, one of the following: a personal computer, laptop, tablet, mobile device, or any other electronic device that communicates with a data storage device.

The data file may be, for example, one of the following: a text document, an image file, an audio file, a video file, a multimedia file, a hyperlink, an RSS feed, a news feed, information related to a chat session, etc.

Each data file contained in the personal database is assigned by the user at least one associative identifier that the user associates with said data file which is written to the database. These associative identifiers are preferably assigned manually by the user using an input device such as a mouse, keyboard, touch panel, microphone, trackball, electronic pen, joystick, digital camera, digital video camera, webcam, neurocomputer interface, etc.

Alternatively, in order to assign the data file an associative identifier that the user associates with said data file, the user selects a suitable associative identifier from a plurality of preset or previously assigned associative identifiers.

Preferably, an associative identifier is one or more letters, numbers, signs, symbols, or any combination of the above. For example, an associative identifier may be at least one natural language word.

In accordance with the method, a primary graph is obtained by displaying it on a screen of a computer. The computer screen may be built into the computer, for example, in the form of a display, or it may be a separate (from the computer) peripheral device such as a monitor, a projector, a neurocomputer interface, etc. The primary graph is a graphical representation, in the form of a network, of all associative identifiers which the user has assigned to the plurality of data files contained in the users database. In said network, each node is an icon of a unique associative identifier from among the assigned associative identifiers. In other words, associative identifiers are not repeated on the graph. The network nodes are connected in pairs so that a link is formed between each pair of icons depicting the associative identifiers assigned to the same data file. The advantage of using such a graph is that the personal database contents is displayed to the user not as a set of tags or names of data files, which are often in no way related to the contents of these data files, but in the form of associative identifiers that have been assigned by user and are understandable to him/her, i.e. in the form of user's associations with the contents of data files stored in the user's personal database. Accordingly, to analyze the contents of the database and/or the data files stored therein, the user does not need to remember the relevant information, nor does need to open the data files. Instead, thanks to the associations displayed on the graph, the user may easily understand what does the whole personal database contain and/or what do individual data files from said database contain.

On the graph, each icon is displayed in the form of a geometric figure and comprises an image of a unique associative identifier.

If the graph is two-dimensional, each graph icon is displayed as a flat geometrical figure, inside, outside or on top of the contour of which a unique associative identifier is displayed. A rectangle, square, hexagon, circle, or any other suitable flat figure, as well as an image, may be used as the said flat geometric figure.

If the graph is three-dimensional, each graph icon is displayed as a three-dimensional geometric figure, inside, outside or on top of which an associative identifier is displayed. A sphere, cube, octahedron or any other suitable volumetric figure with or without texture may be used as a volumetric geometric figure.

In accordance with the method, for each associative identifier, a subjective significance weighting factor (m) of such an associative identifier for the user is calculated. Preferably, for each associative identifier, the weighting factor (m) is calculated based on number of data files to which the user has assigned said associative identifier. There are many options for calculating the weighting factor of an element from an array of elements and, in the opinion of the inventor, there is no need to be limited to one or more of these options. In a preferred embodiment of the method, the weighting factor (m) is calculated taking into account the number of links formed between said associative identifier and the remaining associative identifiers.

The weighting factor (m) determines the size of the icon representing the unique associative identifier. The larger the value of the weighting factor (m) for a particular associative identifier, the larger the size on the graph has an icon that displays said associative identifier. In other words, the size of the icon on the graph depends on the value of the weighting factor (m). In the case of a two-dimensional graph, the weighting factor (m) determines the area of the icon, and in the case of a three-dimensional graph, its volume. In a preferred embodiment, the weighting factor (m) further determines at least one of the following: a shape, color, transparency, location of the icon on the graph.

In accordance with the method, a weighting factor (n) of a link is also calculated, the link formed between every two icons, i.e. each pair of associative identifiers, assigned to the same data file. Preferably, the weighting factor (n) is calculated based on a number of data files common to said pair of associative identifiers. However, it is obvious that many different algorithms exist for calculating the value of the weighting factor (n), which determines the degree of associative relationship between associative identifiers. For example, a modified Sorensen binary similarity measure may be used:

$$n(A, B) = 0.1 + \frac{2(A \cap B)}{(|A| + |B|)},$$

where $(A \cap B)$—number of data files which the associative identifiers "A" and "B" are simultaneously assigned to, while $|A|$ and $|B|$—number of data files which the associative identifiers "A" and "B" are assigned to, respectively.

The weighting factor (n) determines one or more parameters for displaying the link on the graph, wherein the display parameters may be selected from the following group: a thickness, length, color, transparency of the link on the graph.

The mutual arrangement of the icons depicting associative identifiers has a significant impact on the speed of user's interaction with the graph. Obviously, the associative identifiers that are closest in meaning have the strongest connection, and, therefore, the largest weighting factor (n), and therefore shall be located closer to each other than the weakly connected associative identifiers.

For drawing that meets the above requirements, one of the well-known graph layout algorithms may be used: spring Eades algorithm (see P. Eades: A heuristic for graph drawing//*Congressus Numerantium* 42 (1984), pages 149-160), Kamada and Kawai algorithm (see T. Kamada, S. Kawai: An algorithm for drawing general undirected graphs//Inform. Process. Lett. (1989), Vol. 31, pages 7-15), Fruchterman-Reingold forced model (see J. Branke: Dynamic graph drawing II Drawing Graphs, Springer Lecture Notes In Computer Science (2001), pages 228-246) and numerous modifications of these algorithms.

The forced model is further used as an example. In this case, vertices (nodes) of the graph correspond to "charged particles" between which "forces of attraction and repulsion" act. Take the weighting factor (m) as an analogue of the charge, then the nodes of the graph (they are also the icons of associative identifiers) repel each other with a "force" that is a function of the distance therebetween. "Forces of attraction" act between the vertices similarly to the "force of gravity", and are determined by the factor (n), i.e. the "force" of the connection between an associative identifier pair. Typically, "forces of attraction" are also a function of the distance between the vertices.

In general, the "energy of the system", of all elements of the graph, may be expressed as follows:

$$U_{attraction} + U_{repulsion} = \sum_{(u,v)\in E} f_a n_{uv} \|p_u - p_v\|^a + \sum_{(u,v):u\neq v} f_r m_u m_v \|p_u - p_v\|^r$$

where $U_{attraction}$—"attraction energy", and $U_{repulsion}$—"repulsion energy" between the vertices u and v with coordinates $p_u$ and $p_v$, respectively; $m_v$—weight of vertex v; $n_{uv}$—weight of a link between vertices (u, v); a, r—exponents and $\in R$; $f_a$, $f_r$—factors that determine the degree of influence of each component on the final layout of the graph, e R. The generally accepted restrictions are: $f_a>0$, $f_r>0$, $a\geq 0$, $r\leq 0$, that is, "forces of attraction" increase, and "repulsion forces" decrease with increasing distance between the icons.

The graph is in equilibrium, that is, its layout is completed when the "energy" of the whole system is minimal or, at least, the "force of attraction" and "repulsion force" are equal. These "forces" mean the derivative of the "energy of attraction" and "energy of repulsion" over distance, respectively. The certain implementation of the graph layout mechanisms can be found in a number of publications, for example, in the article "Drawing of dynamic graphs for the analysis of complex networks. Modeling and analysis of information systems" by S. N. Pupyrev, A. V. Tikhonov, Vol. 17, No. 1 (2010), pages 117-135.

In accordance with the method, instead of the primary graph, a modified graph is obtained in response to each calculation of at least one of the weighting factors (m, n). This calculation is performed in response to at least one of the following: adding a data file, deleting a data file, adding an associative identifier, deleting an associative identifier, forming an "associative identifier-associative identifier (AI-AI)" link between associative identifiers, deleting an "AI-AI" link. In the case the factors (m, n) are normalized, then such a change may be caused, for example, by a change in the total number of assigned associative identifiers as a result of adding a new associative identifier or deleting a previously assigned associative identifier. In another case, such a change may be caused by the formation of a new link between the data file and the associative identifier which are stored in the database. The advantage of this option is the continuous change (recalculation) of the links between the icons, which ensures the adaptation of the displayed graph to change not only the contents of the personal database, but also the subjective perception of said contents by the user, in particular, the user's associations with data files contained in the personal database.

In a preferred embodiment of the method, a link is additionally formed between each associative identifier and each data file to which said associative identifier is assigned, and for each such a link, the user sets a weighting factor (k) that determines the subjective degree of correspondence of the said associative identifier to the said data file, that is to what extent, in the users opinion, a particular associative identifier corresponds to the data file which it is assigned to. The above link is not displayed on the graph, however, the calculation of the weighting factor (m) is based on the calculated weighting factors (k) of the links between the data file and its associated associative identifiers. The advantage of this option is the ability to adjust the degree of correspondence between the associative identifier and the data file which it is assigned to, based on the users activity when working with the system.

In the case of using weighting factors (k) other than unity, to calculate the weighting factor (m), one may, for example, use the equation:

$$m_A = \sum_i k_{Ai}$$

where $m_A$—weighting factor of the associative identifier "A", $k_{Ai}$—factor of connection between the i-th data file and the associative identifier "A."

For convenience, in some embodiments, the weighting factor (k) values may be normalized.

The weighting factor (k) may be assigned by the user for each "data file—associative identifier" ("DF-AI") link and may, for example, be automatically corrected while working with the database based on how often the data file is opened.

To reduce the routine work of the user, the initial value of the weighting factor (k) may be automatically set the same for all "DF-AI" links, or well-known methods may be used for determining the correspondence of the associative identifier to the contents of the data file. For text documents, for example, it is possible to determine the frequency of occurrence of a word form used as an associative identifier in the content of said text document.

The graph of the contents of the personal database, displayed on the computer screen in accordance with the invention, may also be used by the user to navigate the contents of the database and to search the database for the data files required by the user.

For the above, in one of the preferred embodiments, the graph icon is a selectable graph object that may be selected by the user to search for data files that are assigned an associative identifier depicted on the selected icon. Using one of the above input devices, the user may simultaneously select one or more graph icons to define a search query.

When the user selects one or more graph icons, the remaining graph icons may be temporarily hidden if the weighting factors (m) of the associative identifiers depicted on them exceed the weighting factors (m) of the associative identifiers depicted on the graph icons selected by the user. In this case, the link between two icons is shown on the graph only when both icons between which said link is formed are shown on the graph. Accordingly, in the case of hiding an icon, all links related to such an icon are also hidden. Thus, the user is provided with the ability to quickly and conveniently navigate the contents of the database, taking into account the associative memory of the user, when, in the absence of the desired associations among the larger icons that the user pays attention to first, such larger icons are hidden, and the user gets an opportunity to focus on searching among smaller icons that show associations that were used less often by the user when creating the personal database.

In another preferred embodiment of the method, the graph additionally includes a graph scaling tool (for example, virtual buttons for changing the graph scale), while the method additionally comprises the step at which, if the user cannot select icons of interest to him/her, the graph is scaled to enable the user to select the ones of interest. For example, the user may first scale the graph in such a way to figure out if there are any other associative identifiers in the database at all, and, if the result is positive, said scaling is necessary in order to be able to select icons of such associative identifiers that, due to the small values of the weighting factors (m) initially were not shown at all or were not visible to the user due to their small size.

In accordance with the invention, the proposed method may be implemented by a system comprising: at least one data storage device configured to at least write, store and read data files thereon; a user device configured to be coupling to the at least one data storage device and comprising at least a screen, a processor, a memory with machine-readable instructions stored therein, the execution of which instructions by the processor causes the execution of any of the embodiments of the claimed method, and a control member that provides the user the ability to interact with the contents of the working area of the screen.

The display of the primary and modified graphs in the form of a network of interconnected associative identifiers increases informativeness of the display of the personal database contents due to the weighting factors of the graph elements taken into account when drawing said graphs, which factors may be calculated automatically in accordance with the algorithms used for their calculation, or may be defined manually by the user, as explained above. As a result, according to the invention, a graph is displayed on the computer screen, which is a graphical representation of all user-assigned associations with the contents of the personal database. The ability to select associative identifiers that are shown on the graph, and their graphical representation make it possible to further increase the informativeness of the display of the personal database contents, since such a display is most consistent with the users ideas on the database contents. In addition, the ability to select associative identifiers that are shown on the graph allows to expand the functionality of the users personal database. For example, it allows navigation to analyze the database contents, and also allows to search the database for data files that the user needs.

Unlike the prototype, the invention has a number of distinctive features that are not known from the prior art, which allows one to state that the claimed method is new and consistent with the patentability criterion of inventive step.

The invention may be implemented using known means and methods, which allows one to state that the claimed method is industrially applicable.

In the context of the claimed invention, the term "personal database" should be understood as a user-generated set of data files with specified metadata, the set systematized so that the data files may be found and processed by a computer.

It should be understood that the foregoing general description and the following detailed description are examples only, serve to illustrate, and do not limit the invention as characterized by the appended claims.

BRIEF DESCRIPTION OF THE DRAWINGS

The drawings attached to the present application and forming a part thereof, illustrate and explain the essence of the claimed method.

DETAILED DESCRIPTION

The claimed method may be implemented using a computer as follows.

The user carries out work with a personal database by means of a computer using special software. In particular, the user adds at least one data file to the personal database, for example, five data files (F1 ... F5), which are, respectively, articles with the names "Article_1", "Article_2", etc., by storing in the database the said five data files and associative identifiers assigned thereto, wherein each of said data files is assigned at least one associative identifier that the user subjectively associates with the corresponding data file. Such an associative identifier may represent the users association, for example, with the name or content of the data file. For example, the user assigns to the five data files the associative identifiers "Medicine" (AI1), "Psychology" (AI2), "Pediatrics" (AI3), "Immunology" (AI4), "Surgery" (AI5), "Physiotherapy" (AI6) so that AI1, AI2, AI3 are assigned to "Article_1", AI3, AI4 are assigned to "Article_2", AI1, AI4, AI5 are assigned to "Article_3", AI1, AI5, AI6 are assigned to "Article_4", and AI1, AI2, AI6 are assigned to "Article_5." In this case, for each associative identifier (AI1 . . . AI6), a corresponding subjective significance weighting factor (m1 . . . m6) of such an associative identifier for the user is calculated. In addition, for each pair of associative identifiers assigned to the same data file, a link is formed for which a corresponding weighting factor (n) is calculated. So, for example, for the link between AI2 and AI3, a weighting factor (n23) is calculated. Optionally, the corresponding weighting factors (k) of the subjective degree of correspondence of each associative identifier to the data file which it is assigned to, are also calculated. So, for example, for the link shown by the dotted line between F1 and AI1, the weighting factor (k11) is calculated. Thus, in accordance with the method, a primary graph 10 is obtained on the computer display using special software, schematically shown in FIG. 1.

Figure 1:
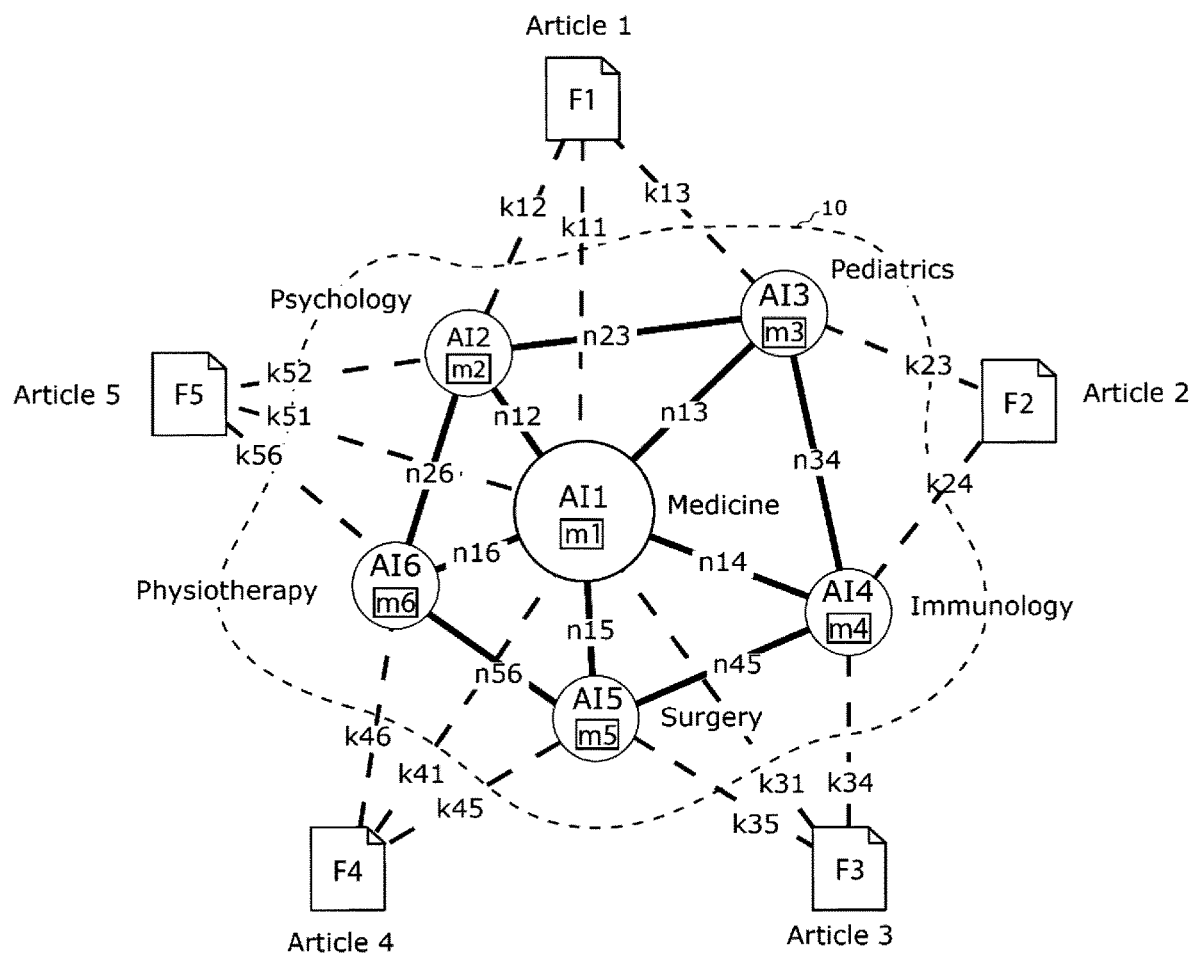
FIG. 1 schematically shows the structure of an initial personal database graph according to the invention.

In FIG. 1, the dotted outline of graph 10 shows what exactly is displayed to the user on the computer screen. So, the primary graph 10 includes the icons of the associative identifiers (AI1 . . . AI6), as well as the links formed between said icons, shown in bold solid lines and having weighting factors (n12, n13, n14, n15, n16, n23, n34, n45, n56, n26). Since AI1 is used by the user more often, that is, a larger number of data files are associated therewith, its icon on the graph 10 is shown larger comparing to the rest of the icons. The graph obtained in this way makes it possible to further increase the informativeness of displaying of the personal database contents. In particular, when viewing the graph 10, the user immediately understands that data files that are somehow related to medicine prevail in the personal database. However, in prior art solutions, the user is simply shown a list of files with the names "Article_1"-"Article_6" inside one of the directories, which would not always allow an artisan to determine the content of said files and find the required file from said files.

Figure 2:
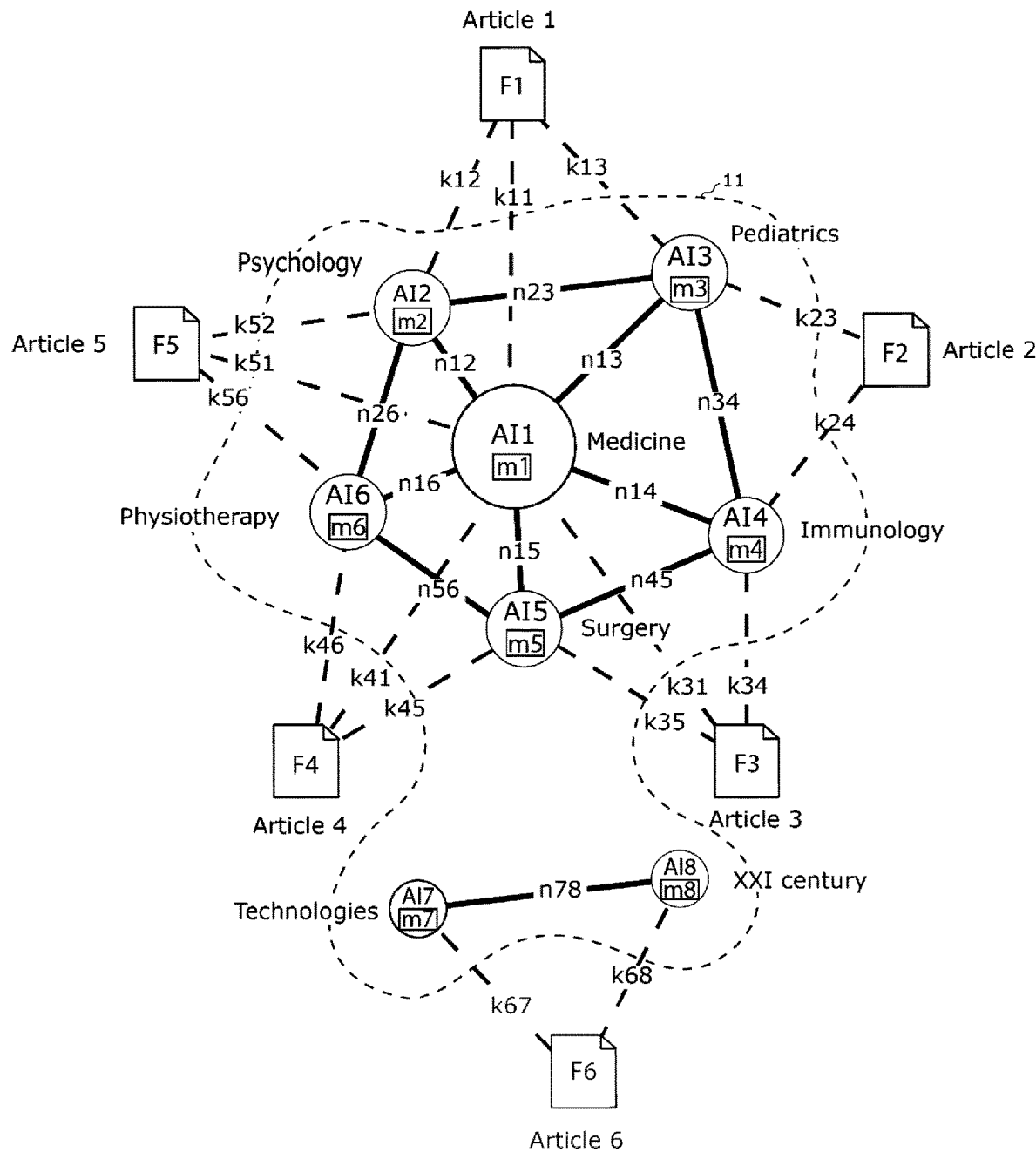
FIG. 2 schematically shows a modified personal database graph according to the invention, wherein the personal database is supplemented with a new data file and new associative identifiers associated only with said new data file.

The user further adds a new data file (F6) to the database, which is an article with the name "Article_6", and, for example, assigns associative identifiers "Technologies" (AI7) and "XXI century" (AI8) thereto. In this case, in accordance with the method, for the associative identifiers (AI7, AI8), the corresponding weighting factors (m7, m8) are calculated, a weighting factor (n78) of the link between AI7 and AI8 is calculated, and, optionally, weighting factors (k67, k68) of the subjective degree of correspondence of associative identifiers (AI7, AI8) to the data file "Article_6." Accordingly, a modified graph 11 is obtained on the computer screen, shown schematically in FIG. 2. The modified graph 11 includes a group of associated icons of associative identifiers (AI1 . . . AI6) and a group of associated icons of associative identifiers (AI7, AI8) located away from the group mentioned first. Since the added AI7 and AI8 are not assigned to the data files previously saved to the database, there are no links between the group (AI1 . . . AI6) and the group (AI7, AI8). Thus, when viewing the graph 11, the user immediately understands that, although articles on medical topics prevail in the personal database, there are, however, also articles related to the technologies of the XXI century.

Figure 3:
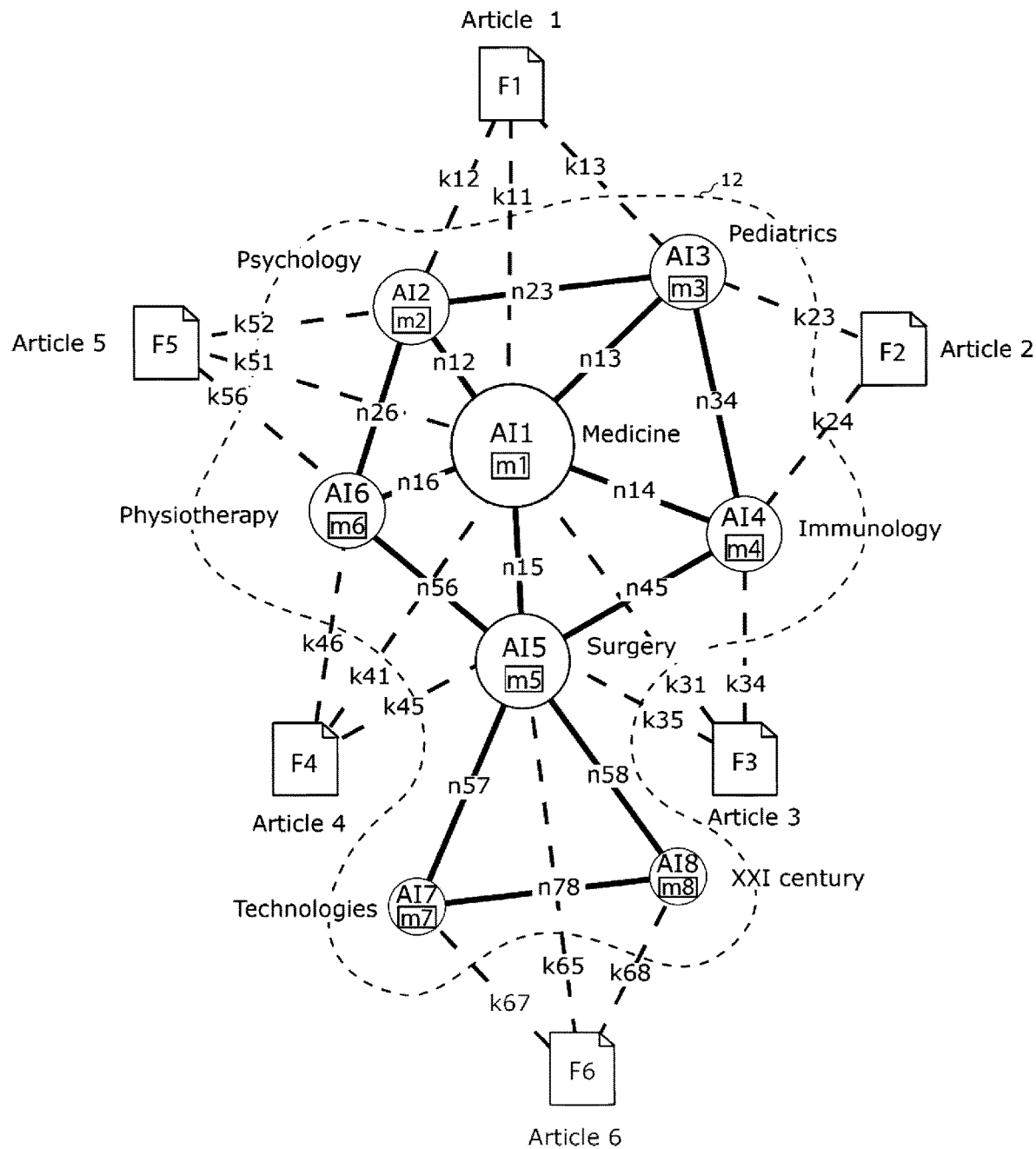
FIG. 3 schematically shows a modified personal database graph according to the invention, wherein the personal database is supplemented with a new data file associated with two new associative identifiers and one associative identifier previously saved in the database.

In an alternative case, in addition to new associative identifiers "Technologies" (AI7) and "XXI century" (AI8), the user may assign a new data file (F6) being added to the database, which is an article with the name "Article_6", the associative identifier "Surgery" (AI5) already contained in the database. In this case, according to the method, in addition to the weighting factors (m7, m8, n78, k67, k68), the calculation of which was discussed above, calculated are a weighting factor (n57) of the link between AI7 and AI5, a weighting factor (n58) of the link between AI8 and AI5, and, optionally, a weighting factor (k65) that characterizes the subjective degree of correspondence of the associative identifier (AI5) to the data file "Article_6." Accordingly, a modified graph 12 is obtained on the computer screen, shown schematically in FIG. 3. The modified graph 12 includes a group of associated icons of associative identifiers (AI1 . . . AI8). Moreover, since not only new AI7 and AI8 are assigned to the added data file "Article_6", but also AI5 already contained in the database (and, therefore, on the primary graph 10), then links are formed between the AI5, AI7 and AI8 icons, which links are shown on the modified graph 12. In this case, the size of the AI5 icon is increased because AI5 is now associated not with two data files, as on the primary graph 10, but with three data files, namely with "Article_3", "Article_4" and "Article_6." Thus, when viewing the graph 12, the user immediately understands that the personal database contains articles on medical topics, among which there are articles related to surgical technologies of the XXI century.

Figure 4:
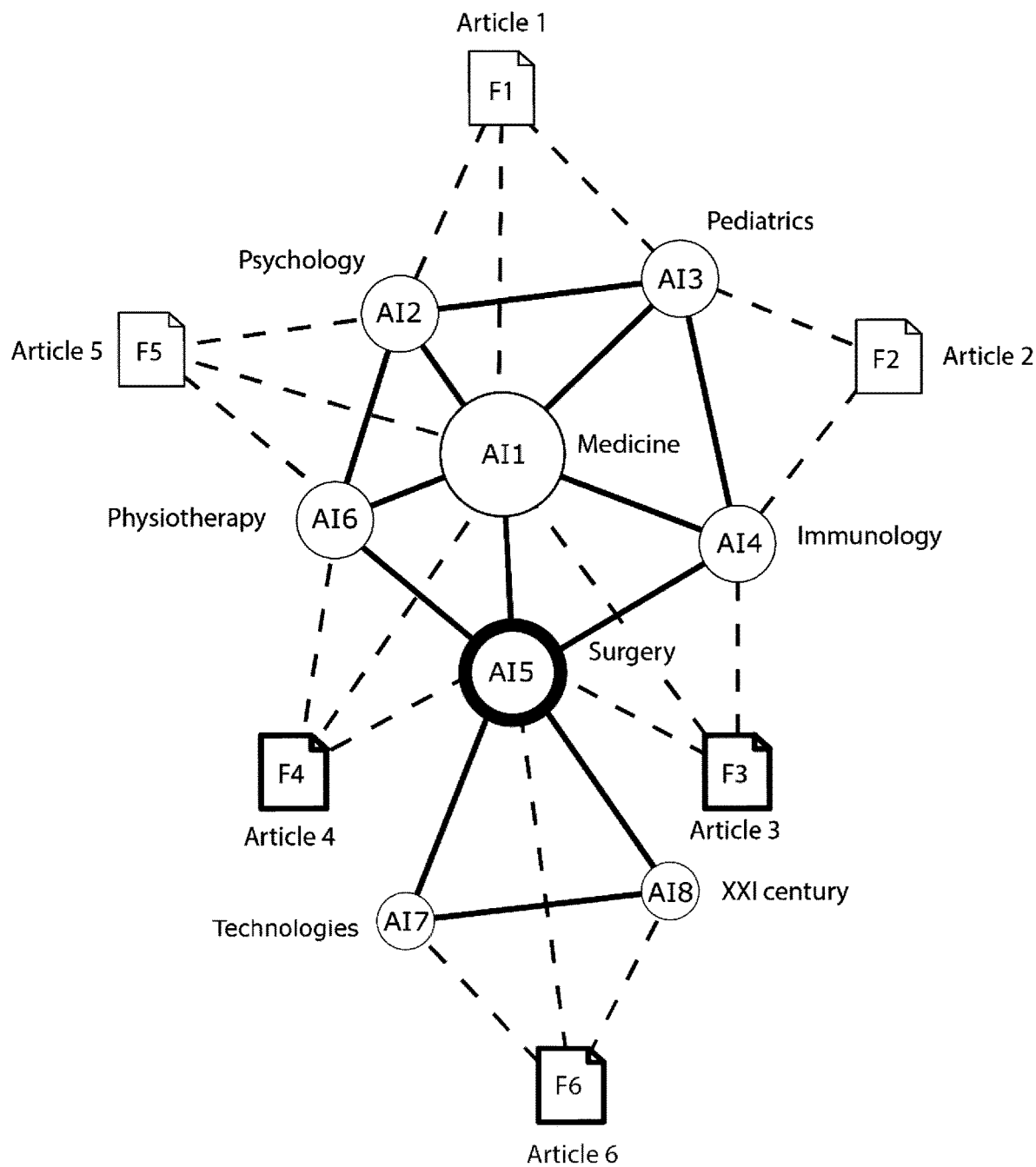
FIG. 4 schematically shows an example of navigation in the graph of FIG. 3 according to the invention.

In one embodiment, a graph icon is a selectable graph object that may be selected by the user to search for data files that are assigned an associative identifier depicted on the selected icon. FIG. 4 shows that the user, through one of the input devices connected to the computer, selected the "Surgery" icon (AI5) on the modified graph of FIG. 3, in order to define a search query and find all data files contained in his/her personal database, which he/she associates with surgery. Obviously, in the above example, the result of such a search is the display of the list of documents to the user, in particular, "Articles_3", "Articles_4" and "Articles_6", since as shown in FIG. 4 the associative identifier "Surgery" is assigned to all said data files.

Figure 5:
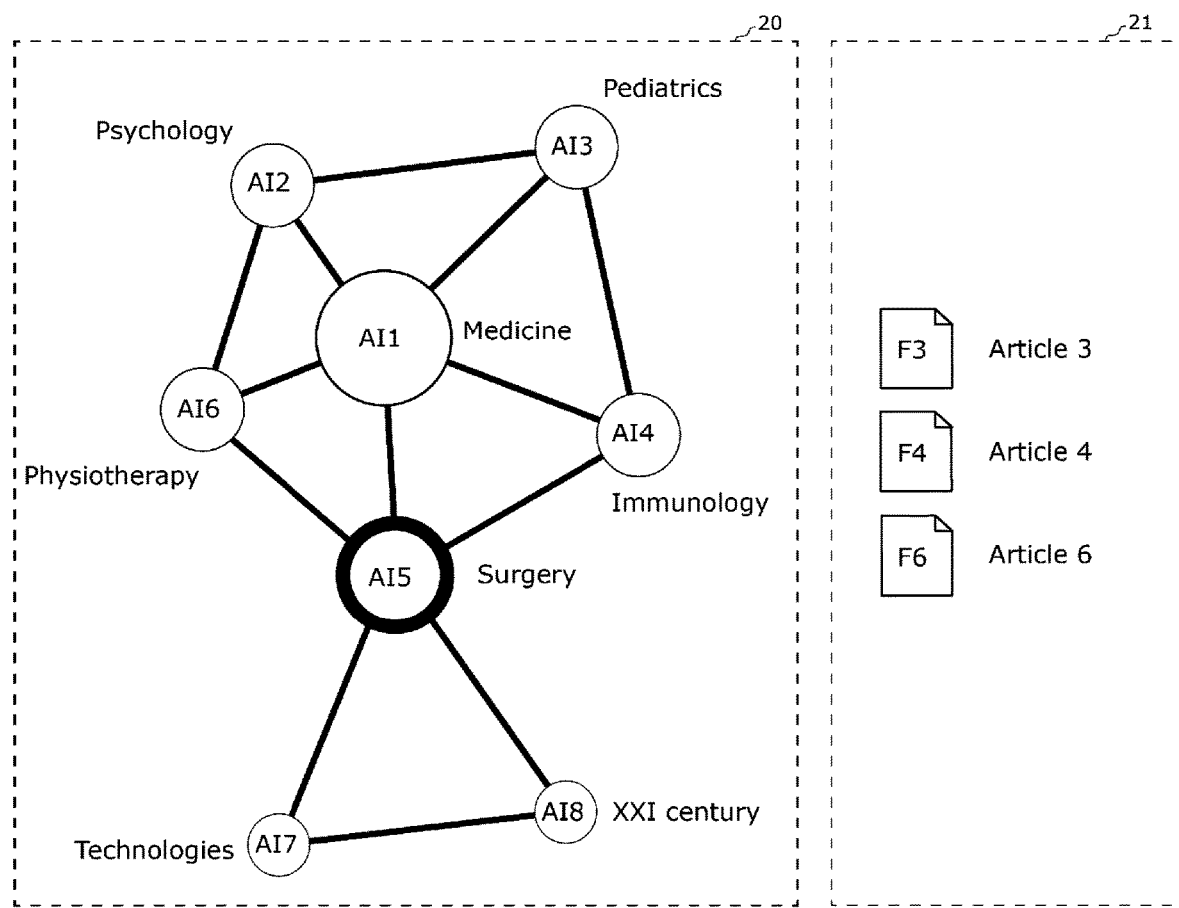
FIG. 5 schematically shows an example of a user interface for searching a personal database.

For the convenience of the user, a user interface may be displayed on the computer screen, the working area of which includes an area 20 for a graph according to the invention and an area 21 for search results' output. FIG. 5 schematically shows an example of such a user interface used in particular for searching a personal database for data files according to the search query of FIG. 4.

According to the example of FIG. 5, the computer screen area 20 displays a graph, on which a search query is defined by the user by selecting the "Surgery" icon (AI5). This query may additionally contain a filter defining meta-information of the data files to be searched. For example, such meta-information may include at least one of the following: the date the data file was added to the personal database, the date the data file was last modified, the type of the data file, etc. Further, the database is searched for data files that satisfy the user-defined search query. As a result of such a search, the data files (F3, F4, F6) named as "Article_3", "Article_4", and "Article_6", respectively, are displayed on the computer screen in the area 21 for subsequent user's interaction with the data files found. In this case, said found data files in the list of search results are ranked by default in accordance with the largest value of the weighting factor (k) of the "DF-AI" link formed between the selected associative identifier and each data file found as a result of the search. However, at the discretion of the user, any other known type of ranking may also be applied, for example, by name of the data file, by size, by frequency of user's access to the data file, etc.

Figure 6:
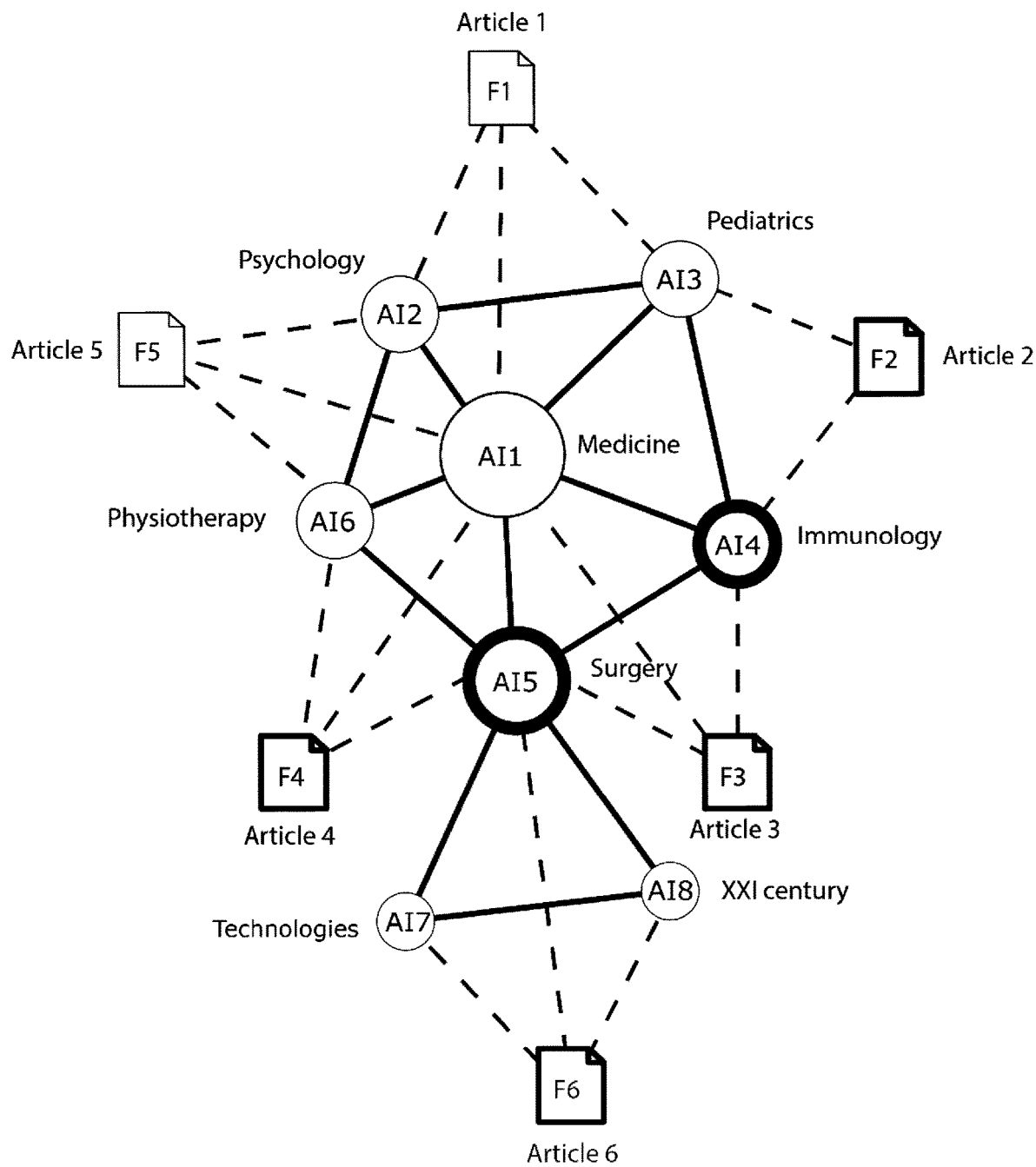
FIG. 6 schematically shows another example of navigation in the graph of FIG. 3 according to the invention.
Figure 7:
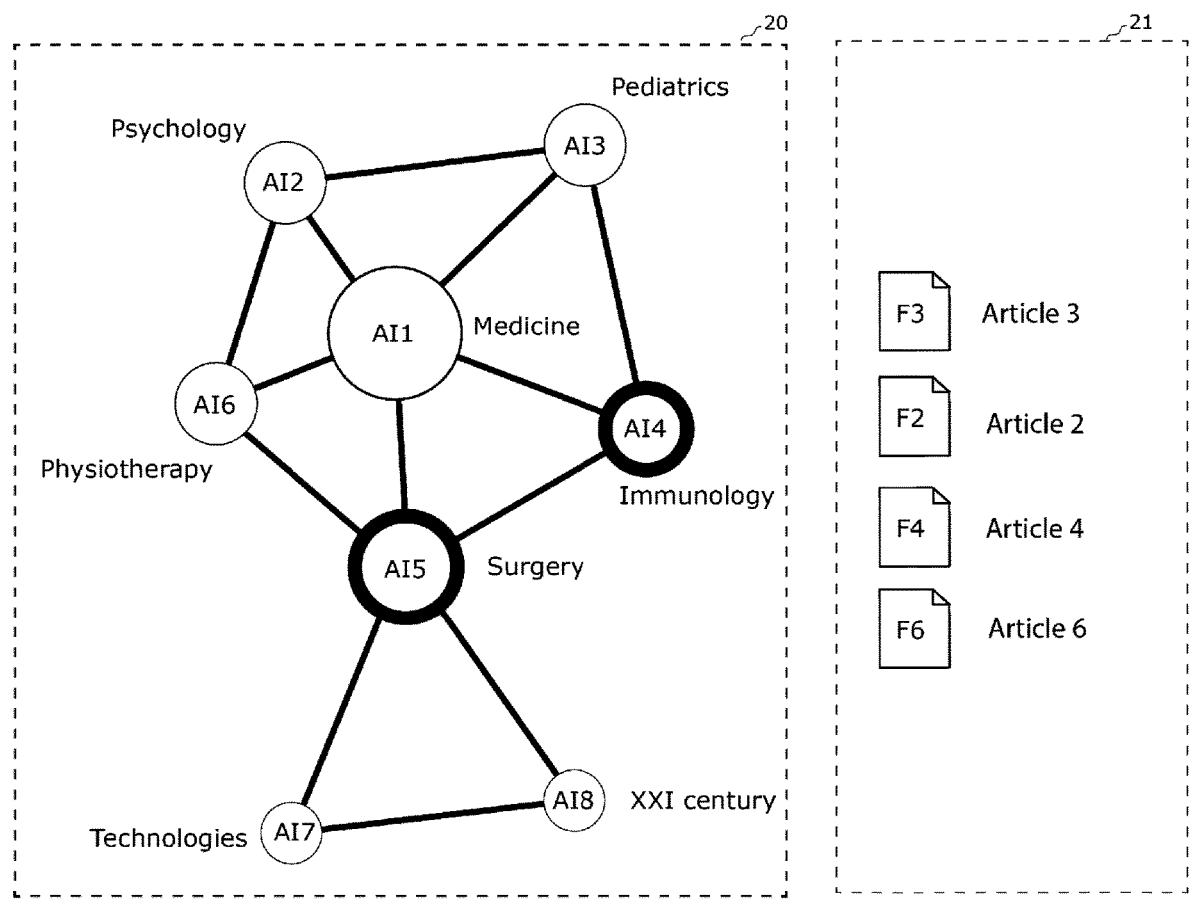
FIG. 7 schematically shows an example of a user interface for searching a personal database.

The user may also select more than one icon on the graph to search for the data files of interests. So, FIG. 6 shows an example of a graph where two pictograms are selected at once by the user—the "Immunology" icon (AI4) and the "Surgery" icon (AI5). If in the graph settings the user preset the condition "OR" for more flexible entry of the search results into the search query, then as a result of the search query defined according to FIG. 6, data files (F2, F3, F4, F6) named as "Article_2", "Article_3", "Article_4", and "Article_6", respectively, are shown in the computer screen area 21 for subsequent user's interaction with the data files found, as shown in FIG. 7. If, however, in the graph settings the user sets "AND" condition for the exact entry of the search results into the search query, then for a similar situation when AI4 and AI5 are selected, only a data file (F3) named as "Article_3" is shown in the computer screen area 21 (this option is not shown in the drawings).

If more than one graph icon is selected, the shown list of data files found as a result of the search is ranked by default according to the largest value of the sum of the weighting factors (k) of the links formed between the selected associative identifiers and each data file found as a result of the search.

In addition, the search query may include the date of the last modification of the graph, wherein the modification of the graph is each addition, deletion, resizing of at least one graph icon and/or calculation, deletion, change of the weight factor (k) of at least one "DF-AI" link. The claimed technical effect is provided due to the interactivity of the displayed graph, which is continuously modified when the database contents changes, or the weighting factors calculated for the graph items change, taking into account the associative approach of the user to the building of the personal database contents.

Other embodiments of the invention may be readily understood by those skilled in the art from the present description and the practice of the invention disclosed therein. The present application is intended to cover all variations, uses or adaptations of the present invention resulting from its general principles, and includes such deviations from the invention, considering them to be in the known or common practice in the art. The present description and embodiments are to be considered as examples only, and the actual scope and spirit of the present invention are set forth in the following claims.

It should be understood that the invention is not limited to the precise structure disclosed above and shown in the drawings, but without going beyond its scope may have various modifications and variations. The scope of the invention is limited only by the appended claims.

What is claimed is:

1. A method for displaying personal database contents on a computer screen, the personal database containing a plurality of data files, each data file is assigned by the user at least one associative identifier that the user associates with said data file, the method comprising the step of:
   obtaining a primary graph being a graphical representation of a relationship of all the associative identifiers which the user has assigned to the plurality of data files contained in the personal database, in the form of a network of nodes and links, by generating a respective node for each associative identifier and a link for each pair of associative identifiers assigned to the same data file by the user, such that each node in the primary graph comprises an icon corresponding to a single associative identifier from among the assigned associative identifiers, and each link identifies a node pair which depicts a pair of associative identifiers assigned to the same data file within the personal database;
   calculating for each user assigned associative identifier for each respective node a subjective significance weighting factor (m), the subjective significance weighting factor (m) determining the size of the respective node icon;
   calculating for each link a weighting factor (n), the weighting factor (n) determining a display parameter of the link; and
   obtaining a modified graph in response to each calculation of at least one of the weighting factors (m, n).

2. The method of claim 1, wherein the subjective significance weighting factor (m) for each node is calculated based on number of data files to which the user has assigned the associative identifier represented by said node,
   wherein the subjective significance weighting factor (m) for each node further determines at least one of the following: a shape, color, transparency, and location of the icon of the respective node on the graph.

3. The method of claim 2, wherein the subjective significance weighting factor (m) for each node is further calculated given a number of links formed between said associative identifier of the respective node and the remaining associative identifiers.

4. The method of claim 1, wherein the weighting factor (n) of the link formed between each pair of respective nodes, depicting a respective pair of associative identifiers assigned to the same data file, is calculated given a number of data files common to associative identifiers represented by said respective nodes, wherein the weighting factor (n) of the link further determines at least one of the following display parameters: a thickness, length, color, transparency of the link on the graph.

5. The method of claim 1, further comprising:
   forming a "DF-AI" link between each associative identifier and the data file which said associative identifier is assigned to; and
   defining for each said "DF-AI" link of a weighting factor (k), the weighting factor (k) characterizing the subjective degree of correspondence of the said associative identifier to the said data file.

6. The method of claim 4, wherein the calculation of the weighting factor (n) of the link formed between each pair of associative identifiers assigned to the same data file is further based on the values of the weighting factors (k) of the corresponding "DF-AI" links.

7. The method of claim 1, wherein each node icon is shown as a geometric figure and comprises an image of a unique associative identifier.

8. The method of claim 1, wherein at least one node icon is a selectable graph object that may be selected by the user to define a search query for searching the desired data files in the personal database.

9. The method of claim 1, wherein the calculation of at least one of the weighting factors (m, n) is performed in response to one of the following: adding a data file, deleting a data file, adding an associative identifier, deleting an associative identifier, forming a link between associative identifiers, deleting a link between associative identifiers.

* * * * *